United States Patent
Jewess et al.

(10) Patent No.: US 10,640,228 B2
(45) Date of Patent: May 5, 2020

(54) AUXILIARY POWER UNIT MOUNTING BRACKET

(71) Applicant: United Technologies Corporation, Hartford, CT (US)

(72) Inventors: Gordon F. Jewess, San Diego, CA (US); Anthony C. Jones, San Diego, CA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 937 days.

(21) Appl. No.: 14/769,316

(22) PCT Filed: Jan. 27, 2014

(86) PCT No.: PCT/US2014/013147
§ 371 (c)(1),
(2) Date: Aug. 20, 2015

(87) PCT Pub. No.: WO2014/175934
PCT Pub. Date: Oct. 30, 2014

(65) Prior Publication Data
US 2016/0001892 A1    Jan. 7, 2016

Related U.S. Application Data

(60) Provisional application No. 61/767,833, filed on Feb. 22, 2013.

(51) Int. Cl.
*B64D 41/00* (2006.01)
*F16M 13/02* (2006.01)
(Continued)

(52) U.S. Cl.
CPC ............ *B64D 41/00* (2013.01); *F01D 25/28* (2013.01); *F02C 7/20* (2013.01); *F16M 13/02* (2013.01);
(Continued)

(58) Field of Classification Search
CPC .. B64D 41/00; B64D 2041/002; F16M 13/02; F02C 7/32; F05B 2260/3011
See application file for complete search history.

(56) References Cited

U.S. PATENT DOCUMENTS 4,984,756 A * 1/1991 Anders ................... B60P 1/365
198/827
5,174,110 A * 12/1992 Duesler .................... F02C 7/32
138/111
(Continued)

FOREIGN PATENT DOCUMENTS

EP    1764306 A2    3/2007
EP    2559912 A1 *  2/2013

OTHER PUBLICATIONS

Wikipedia, Auxiliary power unit, en.wikipedia,org., Feb. 13, 2019 (Year: 2019).*
(Continued)

*Primary Examiner* — Vinh Luong
(74) *Attorney, Agent, or Firm* — Carlson, Gaskey & Olds, P.C.

(57) ABSTRACT

An example auxiliary power unit bracket includes, among other things, a gearbox mounting face and a compartment mounting face, the gearbox mounting face configured to attach to an auxiliary power unit gearbox below a sump level line, the compartment mounting face configured to attach to a portion of an auxiliary power unit compartment above the sump level line.

10 Claims, 4 Drawing Sheets

(51) Int. Cl.
  *F01D 25/28* (2006.01)
  *F02C 7/20* (2006.01)
(52) U.S. Cl.
  CPC .... *B64D 2041/002* (2013.01); *F05D 2220/50* (2013.01)

(56) References Cited

U.S. PATENT DOCUMENTS

| | | | | |
|---|---|---|---|---|
| 6,145,880 | A * | 11/2000 | White | B60R 21/045 |
| | | | | 280/752 |
| 7,516,621 | B2 * | 4/2009 | Suttie | F02C 7/32 |
| | | | | 248/639 |
| 7,708,224 | B2 * | 5/2010 | Aho-Mantila | B64D 27/18 |
| | | | | 244/123.1 |
| 9,964,042 | B2 * | 5/2018 | Anderson | F02C 7/32 |
| 2006/0032974 | A1 * | 2/2006 | Williams | B64D 41/00 |
| | | | | 244/58 |
| 2006/0144050 | A1 | 7/2006 | Williams | |
| 2009/0256021 | A1 * | 10/2009 | Dorrough | E06B 9/303 |
| | | | | 242/397 |
| 2010/0019505 | A1 | 1/2010 | Frost | |
| 2011/0278426 | A1 * | 11/2011 | Duffy | B62D 1/195 |
| | | | | 248/674 |
| 2012/0017722 | A1 | 1/2012 | Bell et al. | |
| 2012/0318913 | A1 * | 12/2012 | Filho | B64D 41/00 |
| | | | | 244/58 |
| 2013/0015291 | A1 | 1/2013 | DeDe et al. | |
| 2013/0320134 | A1 * | 12/2013 | Bell | B64D 41/00 |
| | | | | 244/54 |
| 2016/0169118 | A1 * | 6/2016 | Duong | F02C 7/32 |
| | | | | 74/664 |

OTHER PUBLICATIONS

Define auxiliary power unit, Google Search, google.com., Feb. 13, 2019 (Year: 2019).*
International Search Report and Written Opinion for International Application No. PCT/US2014/013147 dated Nov. 13, 2014.
International Preliminary Report on Patentability for PCT Application No. PCT/US2014/013147, dated Sep. 3, 2015.

* cited by examiner

AUXILIARY POWER UNIT MOUNTING BRACKET

BACKGROUND

This disclosure relates generally to securing an auxiliary power unit.

Turbomachines extract energy from a flow of fluid. During operation, air is pulled into the turbomachine. The air is then compressed and combusted. The products of combustion expand to rotatably drive a turbine section of the turbomachine.

One example turbomachine is an auxiliary power unit (APU). An APU may be located in the tail section or elsewhere on a commercial aircraft. The APU provides electrical power and compressed air to the aircraft.

During operation, the APU is exposed to extreme temperatures and other harsh operating conditions. Tests have been developed to ensure that the APU and its associated components will respond appropriately when facing such conditions. Tests are continually revised and new tests are added. Passing these tests can be difficult, especially when using retrofitted APUs and retrofitted components.

SUMMARY

An auxiliary power unit bracket, according to an exemplary aspect of the present disclosure includes, among other things, a gearbox mounting face and a compartment mounting face, the gearbox mounting face configured to attach to an auxiliary power unit gearbox below a sump level line, the compartment mounting face configured to attach to a portion of an auxiliary power unit compartment above the sump level line.

In a further non-limiting embodiment of the foregoing auxiliary power unit bracket, the bracket has a "U" shape.

In a further non-limiting embodiment of either of the foregoing auxiliary power unit brackets, the bracket comprises steel.

In a further non-limiting embodiment of any of the foregoing auxiliary power unit brackets, the gearbox mounting face is a first gearbox mounting face and the bracket includes a second gearbox mounting face opposite the first gearbox mounting face.

In a further non-limiting embodiment of any of the foregoing auxiliary power unit brackets, the compartment mounting face is a first compartment mounting face and the bracket includes a second compartment mounting face opposite the first compartment mounting face.

In a further non-limiting embodiment of any of the foregoing auxiliary power unit brackets, the gearbox mounting face is configured to attach to an aluminum auxiliary power unit gearbox.

In a further non-limiting embodiment of any of the foregoing auxiliary power unit brackets, a support strap is configured to interface with a downwardly facing portion of the auxiliary power unit gearbox.

In a further non-limiting embodiment of any of the foregoing auxiliary power unit brackets, the compartment mounting face is configured to attach to a strut extending from a wall of the compartment to the compartment mounting face.

An auxiliary power unit assembly according to an exemplary aspect of the present disclosure includes, among other things, a gearbox, the gearbox including a sump level line, the gearbox including at least one mounting pad below the associated sump level line; a bracket including at least one gearbox mounting face secured to a corresponding one of the at least one mounting pad; and an arm of the bracket extending upwardly past the associated sump level line.

In a further non-limiting embodiment of the foregoing auxiliary power unit assembly, the arm extends past the associated sump level line to a compartment mounting face.

In a further non-limiting embodiment of either of the foregoing auxiliary power unit assemblies, a support strap of the bracket extending along a downwardly facing surface of the gearbox.

In a further non-limiting embodiment of any of the foregoing auxiliary power unit assemblies, the at least one mounting pad comprises first and a second mounting pads on opposing lateral sides of the gearbox.

In a further non-limiting embodiment of any of the foregoing auxiliary power unit assemblies, the first and second mounting pads face in opposite directions.

In a further non-limiting embodiment of any of the foregoing auxiliary power unit assemblies, the bracket is steel.

In a further non-limiting embodiment of any of the foregoing auxiliary power unit assemblies, the at least one mounting pad comprises aluminum.

A method of supporting an auxiliary power unit gearbox according to another exemplary aspect of the present disclosure includes, among other things, securing a bracket to a gearbox of an auxiliary power unit at a location that is below a sump level line of the auxiliary power unit gearbox; and securing the bracket to a compartment of an aircraft housing the auxiliary power unit at a location that is above the sump level line of the auxiliary power unit gearbox.

In a further non-limiting embodiment of the foregoing method, the method includes supporting the auxiliary power unit gearbox utilizing a strap extending along a downwardly facing surface of the auxiliary power unit gearbox.

In a further non-limiting embodiment of either of the foregoing methods, the method includes securing the bracket to opposing lateral sides of the gearbox.

Although the different examples have the specific components shown in the illustrations, embodiments of this disclosure are not limited to those particular combinations. It is possible to use some of the components or features from one of the examples in combination with features or components from another one of the examples.

DETAILED DESCRIPTION

Figure 1:
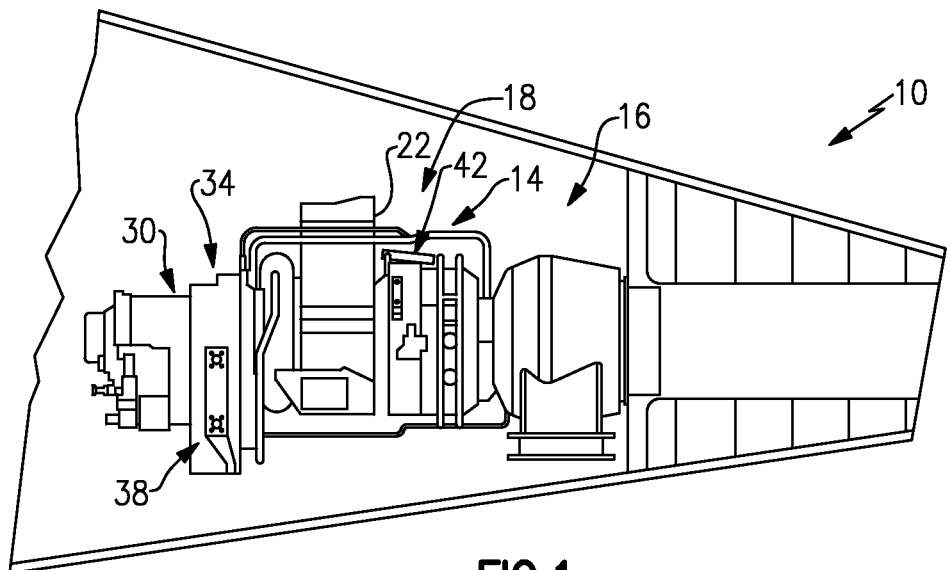
FIG. 1 shows a side view of an auxiliary power unit within a tail section of an aircraft, in an embodiment.
Figure 2:
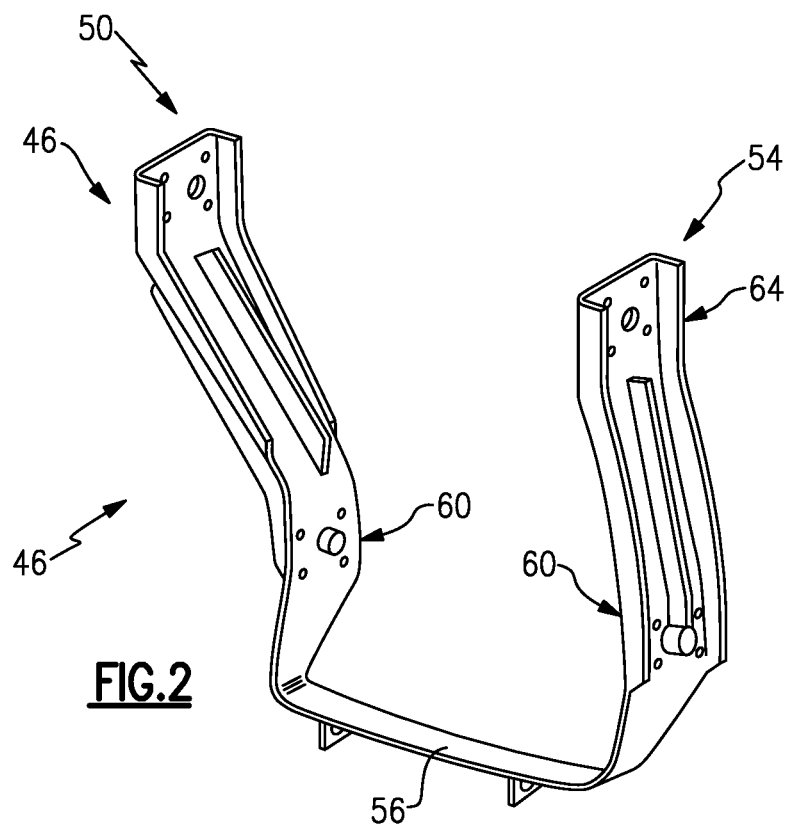
FIG. 2 shows a perspective view of an example mounting bracket for use with the auxiliary power unit of FIG. 1, in an embodiment.
Figure 5:
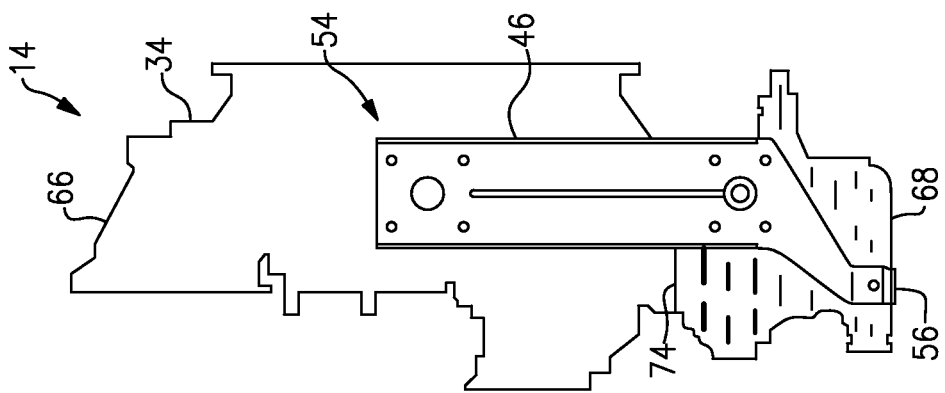
FIG. 5 shows a side view opposite the side view of FIG. 4, in an embodiment.
Figure 4:
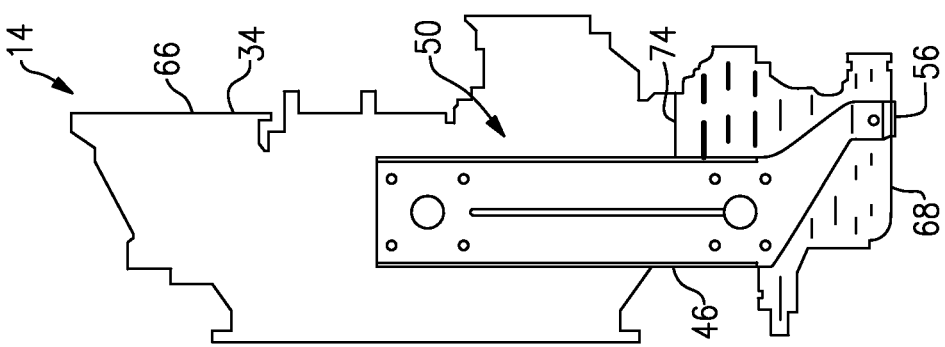
FIG. 4 shows a side view of the mounting bracket of FIG. 2 and a section view of the gearbox, in an embodiment.
Figure 3:
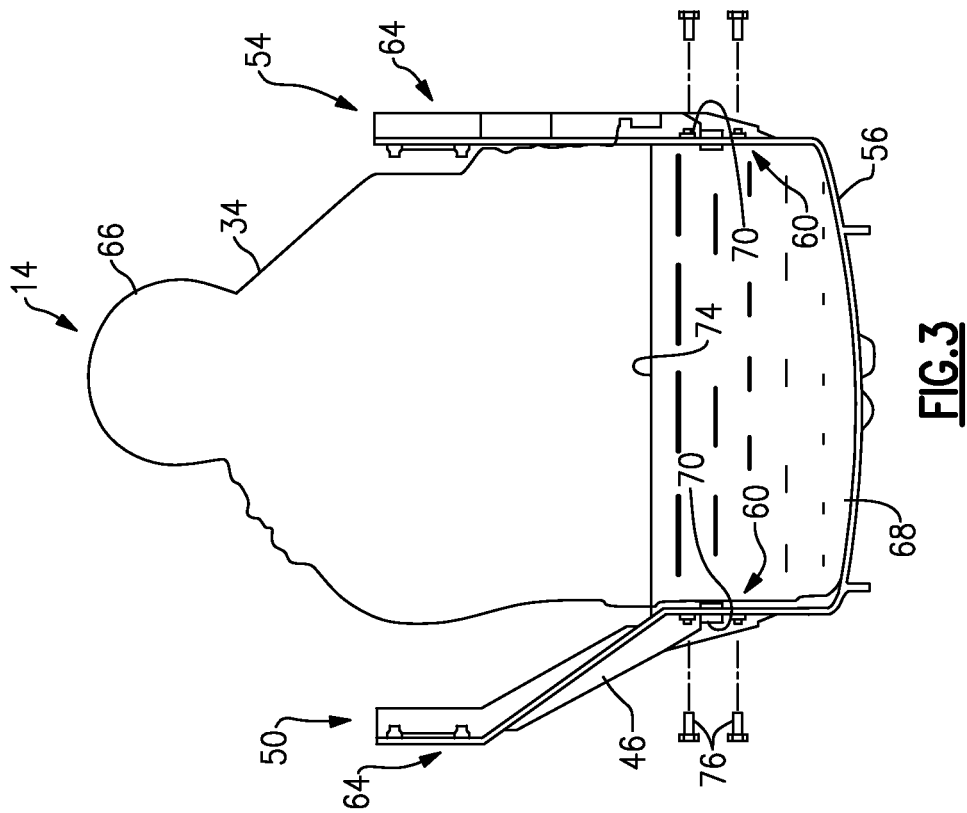
FIG. 3 shows a front view of the mounting bracket of FIG. 2 and a section view of a gearbox of the auxiliary power unit of FIG. 1, in an embodiment.

Referring to FIG. 1, a tail section 10 of an aircraft houses an example auxiliary power unit (APU) 14 within an APU compartment 16. As known, the APU 14 is used to provide power and pressurized air for use in the aircraft.

During operation, air moves to a turbine section 18 of the APU 14 from a plenum 22. The turbine section 18 rotatably drives a generator 30. A gearbox 34 rotatably couples the generator 30 to the turbine section 18. The APU 14 includes various other components to assist in its operation.

Although shown in the tail section 10 of the aircraft, a person having skill in this art and the benefit of this disclosure will understand that the APU 14 could be located elsewhere within the aircraft.

The example APU 14 includes forward mounts 38 and rear mounts 42. Struts (not shown in FIG. 1) are coupled to the mounts 38 and 42 to secure the APU 14 within the compartment 16. To meet regulations, the mounts 38 and 42 must withstand relatively intense temperatures. In one example, the mounts 38 and 42 are required to suitably withstand a temperature of 2000° F. (1093° C.) for 15 or more minutes. The mounting strategy of the example APU 14 facilitates meeting this and other regulations.

Referring now to FIGS. 2-5 with continuing reference to FIG. 1, the gearbox 34 of the example APU 14 includes the forward mounts 38. The gearbox 34 is supported in a mounted position by a bracket 46 secured to the forward mounts 38.

The bracket 46 includes a first arm 50 and a second arm 54 extending upwardly from opposing ends of a support strap 56. Lower ends of the arms 50 and 54 each include a gearbox mounting face 60. Upper ends of the arms 50 and 54 each include a compartment mounting face 64. The bracket 46 generally has a "U" shape.

The bracket 46 is steel in this example, which is a material considered capable of withstanding temperature-based tests. The gearbox 34, by contrast, has an outer housing 66 that is aluminum, which is less capable of withstanding temperature-based tests than steel.

When assembled, the support strap 56 extends across a downwardly facing surface 68 of the gearbox 34, and the gearbox mounting faces 60 attach directly to mounting pads 70 on oppositely facing outer lateral sides of the gearbox 34. The mounting pads 70 are aluminum. Exposure to extreme temperature can damage the mounting pads 70 and undesirably disrupt the connection between the mounting pads 70 and the gearbox mounting faces 60.

In this example, the mounting pads 70 are positioned vertically below a sump level line 74, which represents a level of lubricant (such as oil) held within the gearbox 34. During a thermal event exposing the bracket 46 and the gearbox 34 to extreme temperatures, the lubricant within the gearbox 34 evaporates and cools areas of the gearbox 34, particularly those areas of the gearbox 34 at or below the sump level line 74. Placing the mounting pads 70 below the sump level line thus facilitates maintaining the integrity of the mounting pads 70 during a high temperature event.

The example bracket 46 is secured to the gearbox 34 via four mechanical fasteners 76, such as screws, extending through the gearbox mounting faces 60 to the mounting pads 70 of the gearbox 34.

In this example, positioning the mounting pads 70 below the sump level line 74 ensures that these mechanical fasteners 76 do not loosen or disengage during a thermal event. The bracket 46 maintains its integrity due to its material composition.

Notably, in the event that the connection between the mounting faces 60 and the mounting pads 70 should weaken or become disengaged, the support strap 56 limits downward movement of the gearbox 34 from the mounted position.

Figure 6:
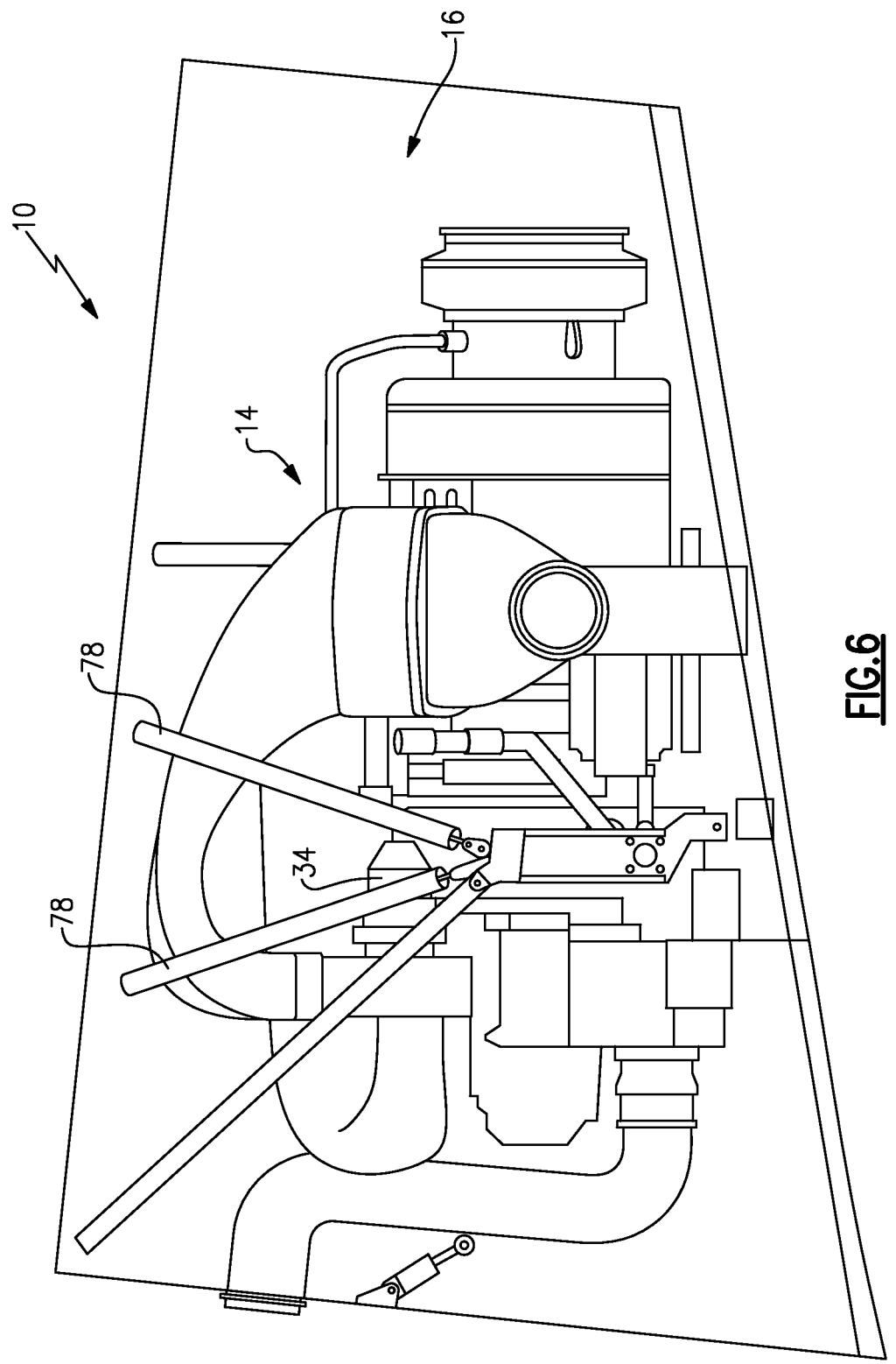
FIG. 6 shows a more detailed view of the APU of FIG. 1 within the tail section, in an embodiment.
Figure 7:
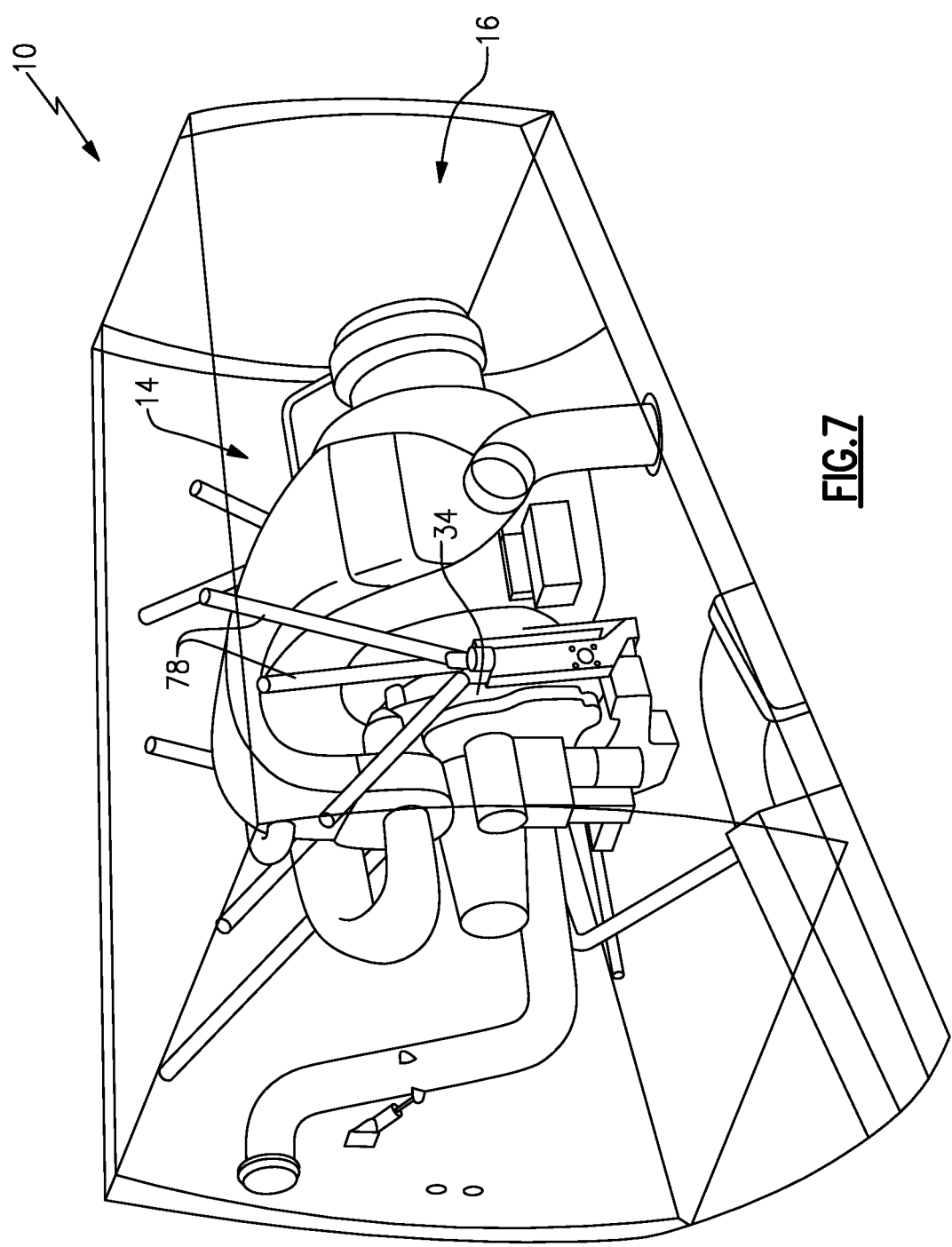
FIG. 7 shows a perspective view of FIG. 6, in an embodiment.

When the gearbox 34 is in the mounted position within the compartment 16, the arms 50 and 54 of the bracket 46 extend upwardly past the sump level line to the compartment mounting faces 64. As shown in FIGS. 6 and 7, struts 78 extending from interior walls of the compartment 16 may be used or secured directly to the compartment mounting faces 64.

Some other APUs include gearboxes that do not require as much vertical packaging area as the gearbox 34. In those APUs, the bracket 46 may be omitted and the struts 78 may attach directly to the gearbox at a position below a sump level line. The bracket 46 of this disclosure allows the APU 14, which requires more vertical packaging area for the gearbox 34, to be introduced into environment designed for the other APUs without requiring significant changes to the locations of the struts, etc.

In this disclosure, elevations and vertical differences refer generally to an orientation where the APU 14 and surrounding structures, such as the aircraft, are on level ground or in straight or level flight.

Features of the disclosed examples include a bracket that permits retrofitting a vertically taller APU into an existing environment without requiring significant packaging changes and while meeting temperature-based testing requirements.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An auxiliary power unit assembly comprising:
   a gearbox, the gearbox including a sump level line, the gearbox including at least one mounting pad below the associated sump level line;
   a bracket including at least one gearbox mounting face secured to a corresponding one of the at least one mounting pad; and
   an arm of the bracket extending upwardly past the associated sump level line;
   wherein the bracket has a "U" shape and includes a support strap that extends along a downwardly facing surface of the gearbox.

2. The auxiliary power unit assembly of claim 1, wherein the arm extends past the associated sump level line to a compartment mounting face.

3. The auxiliary power unit assembly of claim 1, wherein the at least one mounting pad comprises first and a second mounting pads on opposing lateral sides of the gearbox.

4. The auxiliary power unit assembly of claim 3, wherein the first and second mounting pads face in opposite directions.

5. The auxiliary power unit assembly of claim 1, wherein the bracket is steel.

6. The auxiliary power unit assembly of claim 1, wherein the at least one mounting pad comprises aluminum.

7. The auxiliary power unit assembly of claim 1, wherein every location at which the at least one gearbox mounting face is secured to the gearbox is below the associated sump level line.

8. A method of supporting an auxiliary power unit gearbox comprising:
   securing a bracket to a gearbox of an auxiliary power unit at a location that is below a sump level line of the auxiliary power unit gearbox;

securing the bracket to a compartment of an aircraft housing, the auxiliary power unit at a location that is above the sump level line of the auxiliary power unit gearbox; and supporting the auxiliary power unit gearbox utilizing a strap extending along a downwardly facing surface of the auxiliary power unit gearbox.

9. The method of claim 8, including securing the bracket to opposing lateral sides of the gearbox.

10. The method of claim 8, every location at which the bracket is secured to the gearbox is below the sump level line.

* * * * *